United States Patent
Blumenfeld et al.

(10) Patent No.: US 7,682,597 B2
(45) Date of Patent: Mar. 23, 2010

(54) METHOD FOR EXTRACTING HYDROGEN FROM A GAS THAT CONTAINS METHANE, ESPECIALLY NATURAL GAS, AND SYSTEM FOR CARRYING OUT SAID METHOD

(75) Inventors: Michael Blumenfeld, Dortmund (DE); Vincent Liu, Bochum (DE); Bernd Mielke, Bochum (DE); Marcus Michel, Unna (DE)

(73) Assignee: Uhde GmbH, Dortmund (DE)

( * ) Notice: Subject to any disclaimer, the term of this patent is extended or adjusted under 35 U.S.C. 154(b) by 713 days.

(21) Appl. No.: 10/566,268

(22) PCT Filed: Jul. 24, 2004

(86) PCT No.: PCT/EP2004/008322

§ 371 (c)(1),
(2), (4) Date: Mar. 10, 2006

(87) PCT Pub. No.: WO2005/012166

PCT Pub. Date: Feb. 10, 2005

(65) Prior Publication Data

US 2006/0171878 A1    Aug. 3, 2006

(30) Foreign Application Priority Data

Jul. 28, 2003    (DE) ................................ 103 34 590

(51) Int. Cl.
| | |
|---|---|
| C01B 3/26 | (2006.01) |
| C01B 3/24 | (2006.01) |
| C01B 3/02 | (2006.01) |
| C01B 3/12 | (2006.01) |
| C01C 1/04 | (2006.01) |
| C01B 3/00 | (2006.01) |
| C01B 3/50 | (2006.01) |
| F02M 7/24 | (2006.01) |
| C10J 3/68 | (2006.01) |
| C10J 3/00 | (2006.01) |
| B09B 1/00 | (2006.01) |
| C10K 3/06 | (2006.01) |
| C01B 3/04 | (2006.01) |
| B01J 8/00 | (2006.01) |
| F28D 7/00 | (2006.01) |

(52) U.S. Cl. ........................ 423/651; 423/650; 423/652; 423/658.2; 423/655; 423/359; 423/658.3; 423/648.1; 423/361; 48/210; 48/77; 48/94; 48/95; 48/215; 252/374; 252/375; 252/376; 422/234; 422/235

(58) Field of Classification Search ........................ None
See application file for complete search history.

(56) References Cited

U.S. PATENT DOCUMENTS 4,553,981 A    11/1985    Fuderer
(Continued)

FOREIGN PATENT DOCUMENTS

| DE | 36 02 352 A | 7/1987 |
|---|---|---|
| WO | WO 02/068084 A | 9/2002 |

Primary Examiner—Melvin C Mayes
Assistant Examiner—Guinever S Gregorio
(74) Attorney, Agent, or Firm—Collard & Roe, P.C.

(57) ABSTRACT

The invention relates to a method for extracting hydrogen from a gas containing methane, especially natural gas. Hydrocarbons contained in the gas are catalytically broken down in a reformer (4) by steam in order to form hydrogen, carbon monoxide and carbon dioxide. Catalytic conversion of the obtained carbon monoxide with steam occurs in a downstream conversion step in order to form carbon monoxide and water. Carbon dioxide is removed from the converted gas flow (8) by gas washing (7), and the washed hydrogen-rich gas flow (10) is subsequently divided in a pressure-swing adsorption system (11) into a product gas flow (12) made of hydrogen and a waste gas flow (13). The waste gas flow (13) is introduced with hydrogen (14), which is separated from the gas flow (10) after gas washing, into a reformer (4) which is essentially a carbon-free combustible gas, and is combusted there. The invention also relates to a system for carrying out the method.

3 Claims, 2 Drawing Sheets

Figure 1:
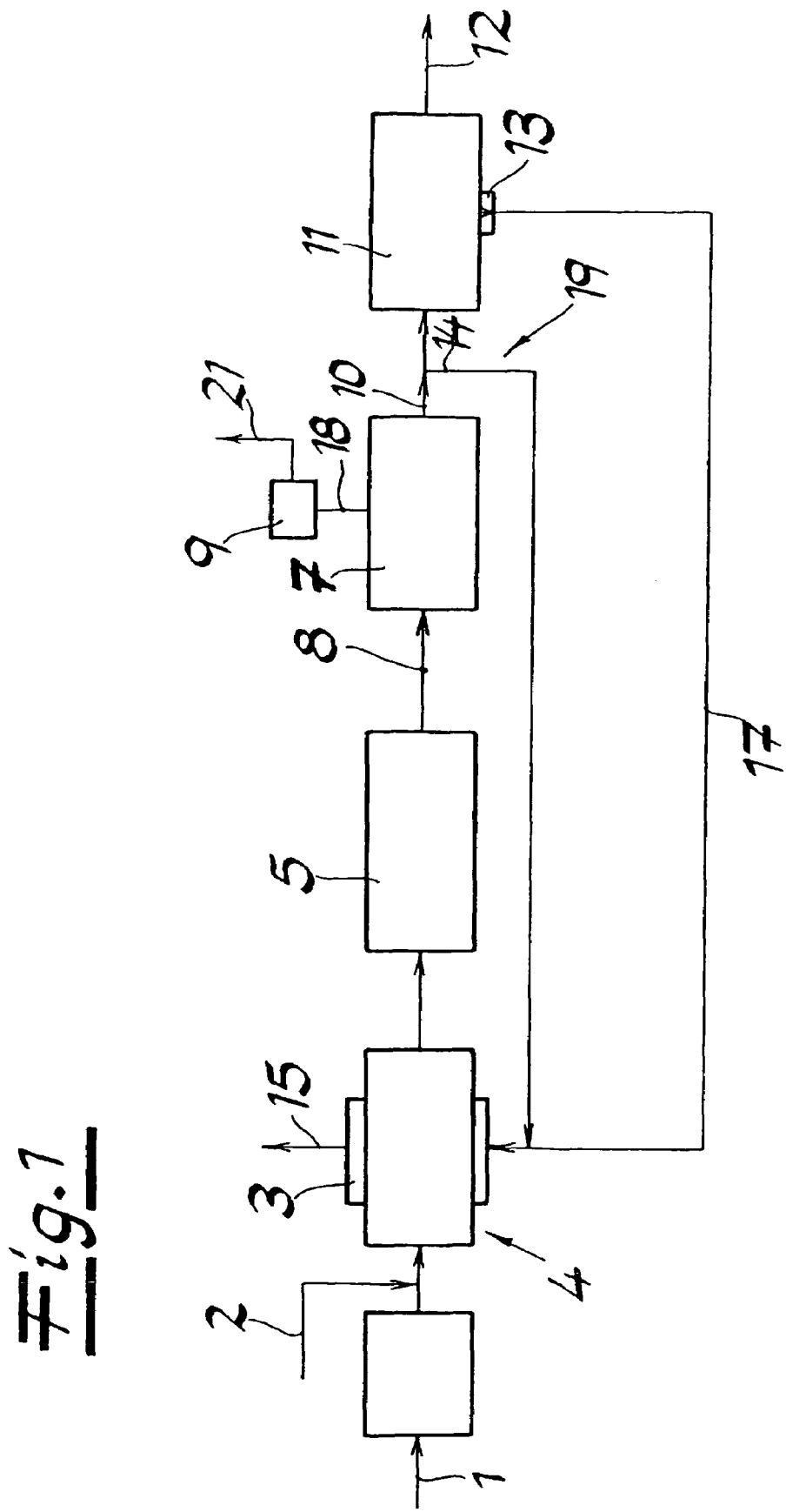

U.S. PATENT DOCUMENTS 5,131,930 A 7/1992 Vines
7,452,393 B2 * 11/2008 Engler et al. .............. 48/198.3
2002/0155061 A1 * 10/2002 Prasad et al. .............. 423/652
2003/0021748 A1 * 1/2003 Hwang et al. .............. 423/652

* cited by examiner

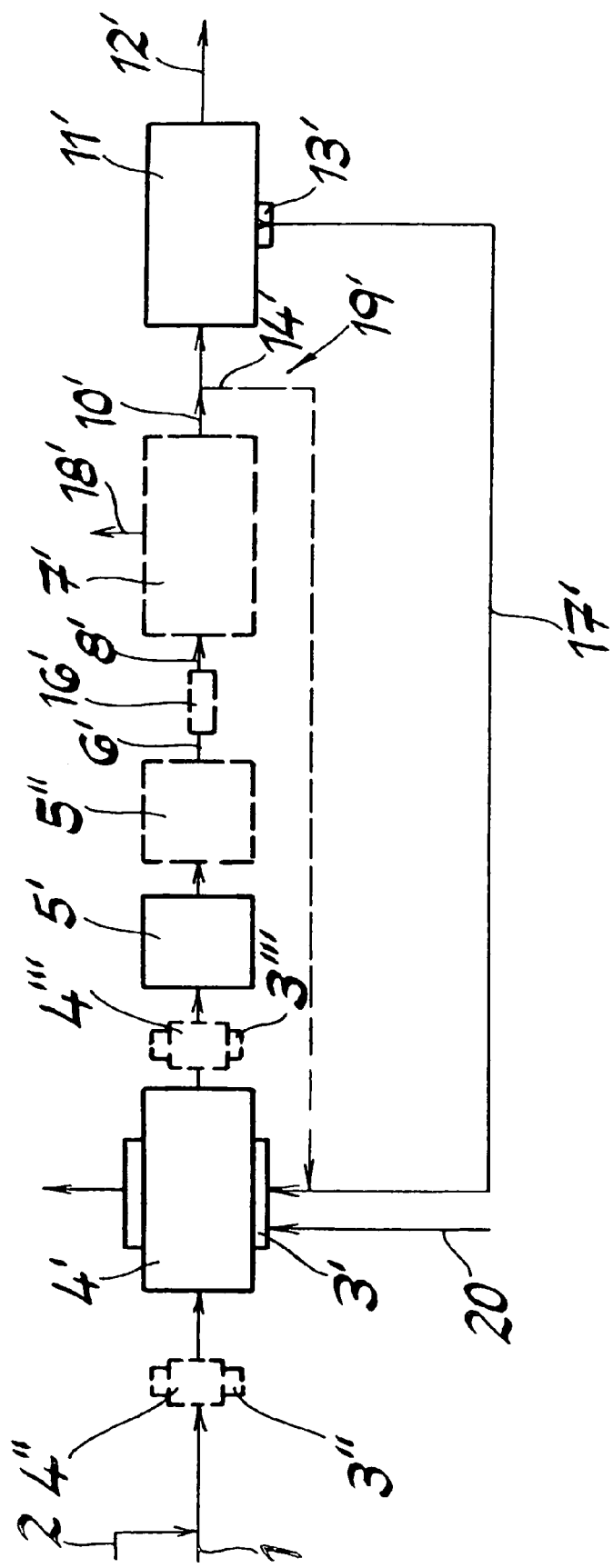

METHOD FOR EXTRACTING HYDROGEN FROM A GAS THAT CONTAINS METHANE, ESPECIALLY NATURAL GAS, AND SYSTEM FOR CARRYING OUT SAID METHOD

CROSS REFERENCE TO RELATED APPLICATIONS

Applicants claim priority under 35 U.S.C. §119 of German Application No. 103 34 590.6 filed Jul. 28, 2003. Applicants also claim priority under 35 U.S.C. §365 of PCT/EP2004/008322 filed Jul. 24, 2004. The international application under PCT article 21(2) was not published in English.

The invention relates to a method for extracting hydrogen from a gas that contains methane, particularly natural gas.

A conventional hydrogen plant is known from U.S. Pat. No. 5,131,930, which is operated with natural gas as the starting material. In the plant, catalytic splitting, generally operated with steam, of hydrocarbons contained in the natural gas first takes place, in a heated reformer, to produce carbon monoxide and synthesis gas that contains hydrogen. Afterwards, catalytic conversion of the carbon monoxide to hydrogen takes place, and subsequently, pure characterization of the hydrogen takes place, using a pressure swing adsorption system. The waste gases of the adsorption system are passed back to the combustion chamber of the reformer, and there they are burned, together with additional natural gas that is supplied. It is also known to use refinery gas or other combustion gases as the additional fuel. A significant amount of carbon dioxide is produced by means of the steam splitting of the methane, in accordance with the water gas equilibrium

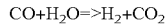

$$CO + H_2O \Rightarrow H_2 + CO_2$$

which increases further in the conversion stage, by means of the carbon monoxide conversion, to a concentration of approximately 16 vol.-% (dry), in general. This amount of carbon dioxide gets into the atmosphere by way of the chimney of the combustion chamber, together with the carbon dioxide produced by the firing of additional fuels that contain carbon. The $CO_2$ content in the flue gas generally lies above 20 vol.-% (dry). In a refinery, a hydrogen plant designed in this manner therefore represents one of the major carbon dioxide emitters.

A method for extracting hydrogen is known from U.S. Pat. No. 4,553,981, in which a gas that contains hydrocarbon is reformed with steam and converted. In a scrubber, a $CO_2$ waste gas stream is then separated from the converted gas stream. Subsequently, isolation of hydrogen takes place using a pressure swing adsorption system. The waste gas stream of the adsorption system is compressed and passed back into the reformation and/or conversion. This results in great circulating streams. To avoid an accumulation of inert gases, such as nitrogen, a purge stream must be removed from the waste gas stream of the pressure swing adsorption system. Firing of the reformer takes place in conventional manner. The method is complicated and expensive.

The invention is based on the task of indicating a simple and inexpensive method for extracting hydrogen from a gas that contains methane, particularly natural gas, in which only small amounts of carbon dioxide are given off into the environment.

The object of the invention and the solution for this task is a method for extracting hydrogen from a gas that contains methane, particularly natural gas, in accordance with claim 1. Hydrocarbons contained in the gas are catalytically split into hydrogen, carbon monoxide, and carbon dioxide, in a reformer, by means of steam, and in a subsequent conversion stage, catalytic conversion of the carbon monoxides that have been formed to carbon dioxide and hydrogen takes place, with steam. The carbon dioxide is removed from the converted gas stream by means of gas scrubbing, and the scrubbed, hydrogen-rich gas stream is subsequently separated into a product gas stream that consists of hydrogen, and a waste gas stream, in a pressure swing adsorption system. The waste gas stream is passed to the reformer, together with hydrogen that is branched off from the gas stream behind the gas scrubber, as a fuel gas that is extensively free of carbon, and combusted there.

While almost complete splitting of the hydrocarbons into hydrogen, carbon monoxide, and carbon dioxide takes place in the reformer, the carbon monoxide that has formed is subsequently converted to carbon dioxide in the conversion stage, and the latter is removed in the subsequent gas scrubber. The waste gas of the pressure swing adsorption system therefore contains essentially hydrogen, and only small remaining amounts of carbon. The same holds true for the hydrogen that is branched off from the gas stream behind the gas scrubber. During the joint combustion of these two gas streams in the reformer, a waste gas that consists predominantly of nitrogen and water is therefore formed, while the carbon dioxide content is low. Because of the gas recirculation, additional firing of the reformer with fuels that contain carbon is eliminated, so that the carbon dioxide emissions are clearly reduced. In comparison with conventional methods, the carbon dioxide emissions can be reduced by approximately 75%. The process technology steps that are used within the framework of the teaching according to the invention are, without exception, proven technologies that have already been used successfully in hydrogen production for a long time. The effort and expense required to achieve the carbon dioxide reduction described are comparatively slight. The possibility therefore also exists to retrofit an existing, conventional hydrogen plant, in order to operate the method according to the invention with this system.

Preferably, a conversion reactor that is operated at medium temperature, or a high-temperature conversion reactor with a subsequent low-temperature conversion reactor are used for the conversion stage. In this way, almost complete conversion of the carbon monoxide that has been formed to carbon dioxide is guaranteed, where the latter can subsequently be removed from the gas stream by way of the gas scrubber. When using a subsequent low-temperature conversion reactor, there is the advantage that the high-temperature conversion reactor of an existing hydrogen plant can continue to be used, thereby clearly lowering the retrofit costs for an existing plant.

Preferably, technically pure carbon dioxide is separated in the gas scrubber, which is used for technical applications or processed further to produce a product having a quality that makes it suitable for use in the foods industry. In addition to use as a material for the foods industry, another possible use of the technically pure carbon dioxide is, for example, filling a petroleum bore as a measure for more efficient petroleum recovery. Alternatively, the carbon dioxide can also be used as a raw material for methanol synthesis. In this connection, the carbon dioxide scrubber can be operated with known physical methods, such as Rectisol, Selexol, or Genosorb, or instead, with a chemical or physical/chemical method, e.g. aMDEA (aqueous solution of N-methyl diethanolamine) or sulfinol.

If an existing $H_2$ plant is retrofitted for the purpose of minimizing $CO_2$, it is practical to compress the converted gas stream before it enters into the newly built $CO_2$ scrubber, in order to equalize the pressure loss that results from this. In this way, the effectiveness of the $CO_2$ scrubber is increased.

The object of the invention is also a system according to claim 4 for carrying out the method. Preferred embodiments of this system are described in the dependent claims 5 and 6.

In the following, the invention will be explained in detail using a drawing that represents an embodiment merely as an example. This schematically shows:

FIG. 1 a block schematic of a method according to the invention,

FIG. 2 a block schematic of a method according to the invention after retrofitting of a conventional hydrogen plant.

FIG. 1 shows a method according to the invention for extracting hydrogen from a natural gas that contains methane. A steam stream 2 is mixed into a natural gas stream 1. The hydrocarbons contained in the natural gas, particularly methane, are catalytically split into hydrogen, carbon monoxide, and carbon dioxide, in a reformer 4 equipped with a combustion chamber 3, using the steam stream 2 that is mixed in. This reformation takes place almost completely, so that practically no gases that contain hydrocarbons are present, any longer, at the exit from the reformer 4. In a subsequent conversion reactor 5 that is operated at medium temperature, catalytic conversion of the carbon monoxide that has formed to carbon dioxide and hydrogen takes place, using steam. This reaction also proceeds almost completely, so that the carbon monoxide content of the gas stream 8 that exits from the conversion reactor 5 is less than 1 vol.-% (dry). Subsequently, the carbon dioxide that has formed is removed from the gas stream 8 almost completely, using a gas scrubber 7. In the exemplary embodiment, the gas scrubber 7 is operated with an aqueous solution of N-methyl diethanolamine (aMDEA) as the scrubbing fluid. However, it also lies within the scope of the invention to use other known scrubbing methods, such as Rectisol, Selexol, Genosorb, or sulfinol, for example. The carbon dioxide 18 obtained in the scrubber 7 is further concentrated in another purification stage 9, to a purity that can be used in the foods industry. The scrubbed gas stream 10 now contains only slight amounts of carbon, and is subsequently separated into a product gas stream that consists of hydrogen 12, and a waste gas stream 13, in a pressure swing adsorption system". The product gas stream 12 has a hydrogen content of more than 99 vol.-%. The waste gas stream 13 also contains essentially hydrogen and only slight amounts of non-converted or only partially converted hydrocarbons. Together with a partial stream 14 that is branched off behind the scrubber 7, by way of a device 19, which also consists essentially of hydrogen, the waste gas stream 13 is passed to the combustion chamber 3 of the reformer 4 by way of a line 17, and burned there. In this connection, the amount of the partial stream 14 is adjusted in such a manner that it covers the energy demand of the reformer 4, during common combustion with the waste gas stream 13. Since both the waste gas stream 13 and the partial stream 14 consist predominantly of hydrogen, and contain only slight amounts of carbon, the waste gas 15 of the combustion chamber 4 has a high steam content and only a small carbon dioxide component. As compared with conventional methods for extracting hydrogen, in which the combustion chamber is fired with fuels that contain carbon, such as natural gas and waste gases that contain hydrocarbons, for example, the method according to the invention is therefore characterized by low carbon dioxide emissions.

The method steps described, which are used within the scope of the teaching according to the invention, are all technically mature technologies that have proven themselves both in the production of hydrogen and in the production of ammonia. The reformer 4 merely has to be sized sufficiently large to guarantee the $H_2$ production, including the fuel gas supply after the $CO_2$ scrubbing. The conversion reactor 5 is operated at medium temperature, in order to ensure almost complete conversion of the carbon monoxide that has formed to carbon dioxide. The carbon dioxide 21 that is obtained by means of the purification step 9 in the exemplary embodiment can be processed further in the foods industry. Alternatively to this, however, there is the possibility of utilizing the technically pure carbon dioxide 18 that was extracted in the scrubber 7 directly for technical applications. Possibilities here are filling a petroleum bore as a measure for efficient petroleum transport, or use as a raw material for methanol synthesis.

The effort and expense for carrying out the method described are relatively slight. In particular, there is the possibility of retrofitting an existing, conventional hydrogen plant in such a manner that the method according to the invention can be operated with it. FIG. 2 shows a conventional hydrogen plant that has been retrofitted according to the invention. The already existing plant components are shown with solid lines, while the components added within the scope of retrofitting are shown with broken lines. The conventional hydrogen plant has a reformer 4' equipped with a combustion chamber 3', for catalytic splitting of gaseous hydrocarbons with steam. Behind this, a high-temperature conversion reactor 5' for catalytic conversion of carbon monoxide to carbon dioxide with steam is disposed. This is followed by a pressure swing adsorption system 11' for the isolation of hydrogen 12' from the converted gas stream 8', with a connected gas line 17' to the combustion chamber 3' for the purpose of firing the reformer 4' with a waste gas stream 13' exiting from the adsorption. system 11'. Within the scope of retrofitting, the capacity of the reformation step was increased by approximately 20% by means of a pre-reformer 4" that precedes the reformer 4', as well as a postreformer 4''', that follows the reformer 4'. If necessary, it might also be sufficient to provide only one of the two additional reformers 4", 4'''. The high-temperature conversion reactor 5', which generally works at temperatures between 360 and 500° C., was supplemented with a subsequent low-temperature conversion reactor 5" that works in the range of approximately 210 to 270° C., in order to achieve conversion of the carbon monoxide to carbon dioxide that is as complete as possible. Alternatively to this, the existing high-temperature conversion reactor 5' can also be replaced with a conversion reactor that works at medium temperature. A gas compressor 16' for compressing the gas stream 6', as well as a gas scrubber 7' for separating the carbon dioxide 18' that was formed were provided between the conversion stage and the pressure swing adsorption system 11', whereby in the exemplary embodiment, the carbon dioxide 18' that was extracted in the gas scrubber 7' is directly passed to a technical application. Between the scrubber 7' and the pressure swing adsorption system 11', an additional device 19' is provided for returning part 14' of the hydrogen-rich gas stream 10' that leaves the gas scrubber into the fuel chamber 3', 3", 3''' of the reformers 4', 4", 4'''. Subsequently, an adjustment of the existing reformer 4' to the combustion takes place, as does waste heat utilization of the fuel that is now rich in hydrogen. The existing gas line 20 for feeding fuel gases that contain hydrocarbons into the combustion chamber 3' of the reformer 4' is no longer utilized. The representation in FIG. 2 shows that a conventional hydrogen plant can be retrofitted, with relatively little effort and expense, in such a manner that the method according to the invention can be operated with it. In this way, the attractiveness of the method according to the invention is further increased.

The invention claimed is:

1. A method for extracting hydrogen from a gas that contains methane comprising:

catalytically splitting hydrocarbons contained in the gas into hydrogen, carbon monoxide, and carbon dioxide in a reformer, by means of steam;

performing catalytic conversion of the carbon monoxide that was formed to carbon dioxide and hydrogen in a subsequent conversion stage, with steam;

removing the carbon dioxide after the step of catalytic conversion by means of a gas scrubber;

subsequently separating the remaining gas stream into a product gas stream that consists of hydrogen, and a waste gas stream, in a pressure swing adsorption system;

passing the entire waste gas stream to a combustion chamber of the reformer, together with a partial hydrogen stream that is branched off from the gas behind the gas scrubber, as a combustion gas that is extensively free of carbon, and burning the waste gas stream and said partial hydrogen stream in the reformer;

wherein during the production of hydrogen in a steady-state operation the amount of the partial hydrogen stream is adjusted so that the partial hydrogen stream meets an energy demand of the reformer during common combustion with the waste gas stream.

2. The method according to claim 1, wherein a conversion reactor operating at temperatures between 360 and 500° C. and a subsequent conversion reactor operating at temperatures between 210 and 270° C. are used for the conversion stage.

3. The method according to claim 1, wherein the carbon dioxide separated in the gas scrubber is used for technical applications or processed further to produce a product having a quality that can be used in the foods industry.

* * * * *